United States Patent
Yagi et al.

(10) Patent No.: US 11,190,742 B2
(45) Date of Patent: Nov. 30, 2021

(54) PROJECTION APPARATUS AND CONTROL METHOD THEREOF

(71) Applicant: CANON KABUSHIKI KAISHA, Tokyo (JP)

(72) Inventors: Masaya Yagi, Yokohama (JP); Takashi Asaka, Tokyo (JP); Tetsuji Saito, Kawasaki (JP); Toru Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/854,142

(22) Filed: Apr. 21, 2020

(65) Prior Publication Data

US 2020/0344453 A1    Oct. 29, 2020

(30) Foreign Application Priority Data

Apr. 25, 2019   (JP) .............................. JP2019-084489

(51) Int. Cl.
*H04N 9/31*   (2006.01)

(52) U.S. Cl.
CPC ......... *H04N 9/3179* (2013.01); *H04N 9/3141* (2013.01)

(58) Field of Classification Search
CPC .. H04N 9/3173; H04N 9/3179; H04N 9/3185; H04N 9/3141; H04N 9/3194; G06F 30/34; G06F 15/7871; H04W 4/50; Y02D 10/00; G03B 21/10; G03B 29/00
See application file for complete search history.

(56) References Cited

U.S. PATENT DOCUMENTS

| | | | |
|---|---|---|---|
| 2013/0094705 A1* | 4/2013 | Tyagi | F16P 3/144 382/103 |
| 2016/0191877 A1* | 6/2016 | Ono | H04N 9/3185 348/744 |
| 2017/0019659 A1* | 1/2017 | Xiang | H04N 13/239 |
| 2017/0090851 A1* | 3/2017 | Takano | G02B 27/0101 |
| 2017/0127214 A1* | 5/2017 | Sohn | G06F 8/654 |
| 2017/0237828 A1* | 8/2017 | Ueta | H04L 67/327 709/221 |
| 2018/0146179 A1* | 5/2018 | Ohno | G03B 21/145 |
| 2018/0246735 A1* | 8/2018 | Thach | G06F 30/327 |
| 2018/0300442 A1* | 10/2018 | Izumi | G06F 30/327 |
| 2018/0300652 A1* | 10/2018 | Izumi | H03K 19/17764 |
| 2019/0042863 A1* | 2/2019 | Kasuga | G06K 9/00805 |
| 2019/0098265 A1* | 3/2019 | Takahama | H04N 9/3114 |
| 2019/0128732 A1* | 5/2019 | Ando | G01S 17/04 |
| 2019/0129630 A1* | 5/2019 | Erez | G06F 3/0634 |
| 2020/0167888 A1* | 5/2020 | Katayama | H04N 7/181 |
| 2020/0311496 A1* | 10/2020 | Kitai | G06K 15/1848 |

FOREIGN PATENT DOCUMENTS

JP          2015-184549 A    10/2015

\* cited by examiner

*Primary Examiner* — Paulos M Natnael
(74) *Attorney, Agent, or Firm* — Cowan, Liebowitz & Latman, P.C.

(57) ABSTRACT

A projection apparatus according to the present invention, includes: a field programmable gate array (FPGA) configured to control projection; and at least one processor which functions as: a configuration unit configured to configure a circuit to be included in the FPGA to a circuit corresponding to a state of the projection apparatus.

15 Claims, 13 Drawing Sheets

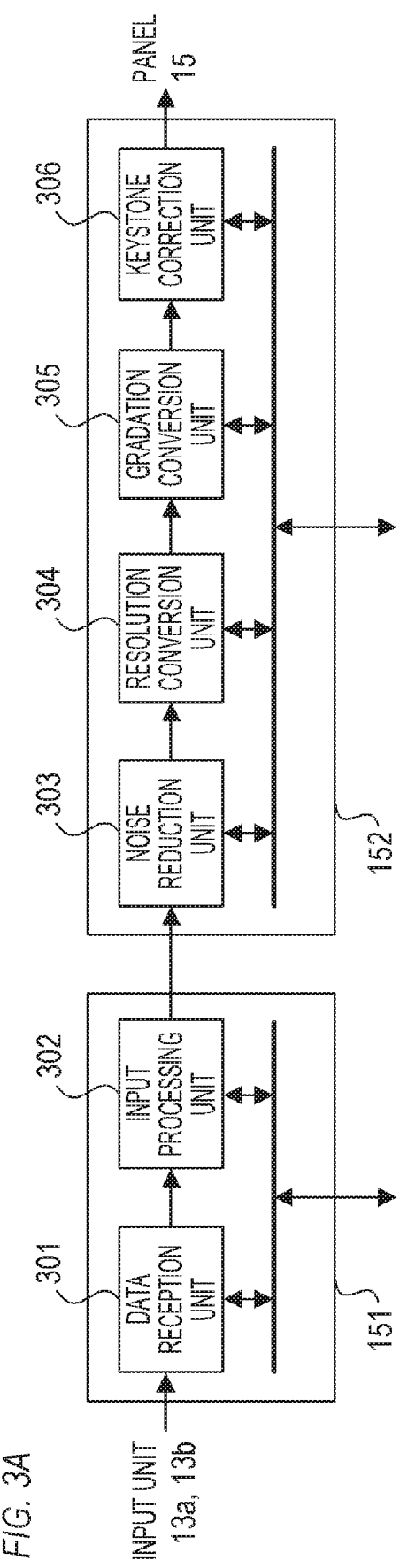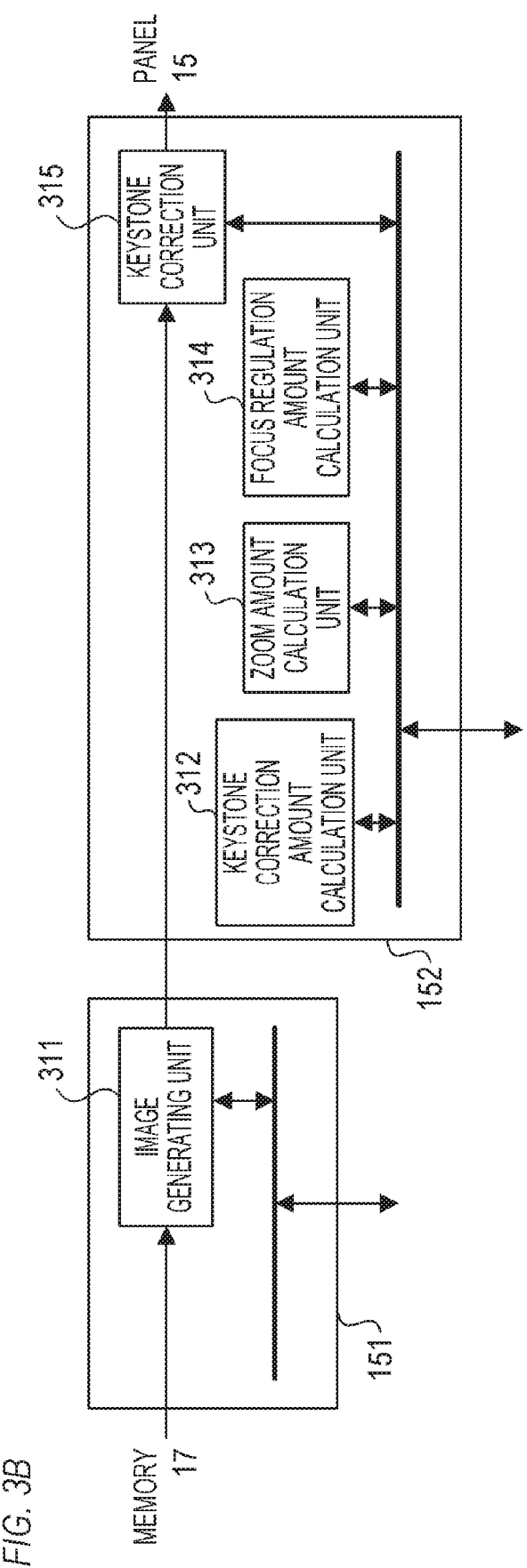

INSTALLATION CONTROL

PROJECTION CONTROL

FIG. 6

| ADDRESS | CIRCUIT CONFIGURATION DATA | BIT DEPTH | KEYSTONE CORRECTION | WARPING CORRECTION GRID POINT COUNT | UNEVENNESS CORRECTION GRID POINT COUNT | INSTALLATION STATE |
|---|---|---|---|---|---|---|
| 0x0000 | CIRCUIT CONFIGURATION DATA 1 | 36 | — | — | 128 | INSTALLATION STATE 1 |
| 0x1000 | CIRCUIT CONFIGURATION DATA 2 | 30 | — | 128 | — | INSTALLATION STATE 2 |
| 0x2000 | CIRCUIT CONFIGURATION DATA 3 | 30 | VERTICAL ±30° | 32 | 32 | INSTALLATION STATE 3 |

GRID POINT

Sa

Sb

GRID POINT

| 50 | 50 | 50 | 50 | 50 | 50 | 50 |
|---|---|---|---|---|---|---|
| 50 | 30 | 30 | 30 | 30 | 30 | 50 |
| 50 | 30 | 0 | 0 | 0 | 30 | 50 |
| 50 | 30 | 0 | 0 | 0 | 30 | 50 |
| 50 | 30 | 30 | 30 | 30 | 30 | 50 |
| 50 | 50 | 50 | 50 | 50 | 50 | 50 |

PROJECTION APPARATUS AND CONTROL METHOD THEREOF

BACKGROUND OF THE INVENTION

Field of the Invention

The present invention relates to a projection apparatus and to a control method thereof.

Description of the Related Art

There are electronic apparatuses which utilize a programmable logic circuit that can be programmed by a user. Japanese Patent Application Publication No. 2015-184549 discloses a video processing apparatus that switches a circuit of a video processing unit in accordance with a signal that instructs switching of a video processing function.

The projection apparatus requires a projection circuit for executing a process pertaining to image projection, and an installation/adjustment circuit for executing processes pertaining to installation, adjustment and so forth of the projection apparatus. Herein one circuit for executing the functions of the projection circuit and of the installation/adjustment circuit may in some instances fail to implement all the functions, on account of resource limitations (circuit resources; hardware resources).

SUMMARY OF THE INVENTION

The present invention in its first aspect provides a projection apparatus comprising:
a field programmable gate array (FPGA) configured to control projection; and
at least one processor which functions as: a configuration unit configured to configure a circuit to be included in the FPGA to a circuit corresponding to a state of the projection apparatus.

The present invention in its second aspect provides a control method of a projection apparatus, comprising:
a control step of controlling projection by a field programmable gate array (FPGA); and
a configuration step of configuring a circuit to be included in the FPGA to a circuit corresponding to a state of the projection apparatus.

The present invention in its third aspect provides a non-transitory computer readable medium that stores a program, wherein the program causes a computer to execute a control method of a projection apparatus, comprising:
a control step of controlling projection by a field programmable gate array (FPGA); and
a configuration step of configuring a circuit to be included in the FPGA to a circuit corresponding to a state of the projection apparatus.

Further features of the present invention will become apparent from the following description of exemplary embodiments with reference to the attached drawings.

BRIEF DESCRIPTION OF THE DRAWINGS

FIGS. 3A and 3B are schematic diagrams of an image input unit and an image processing unit according to Embodiment 1;

FIG. 6 is a table illustrating circuit configuration data according to Embodiment 2;

DESCRIPTION OF THE EMBODIMENTS

Embodiment 1

Figure 13:
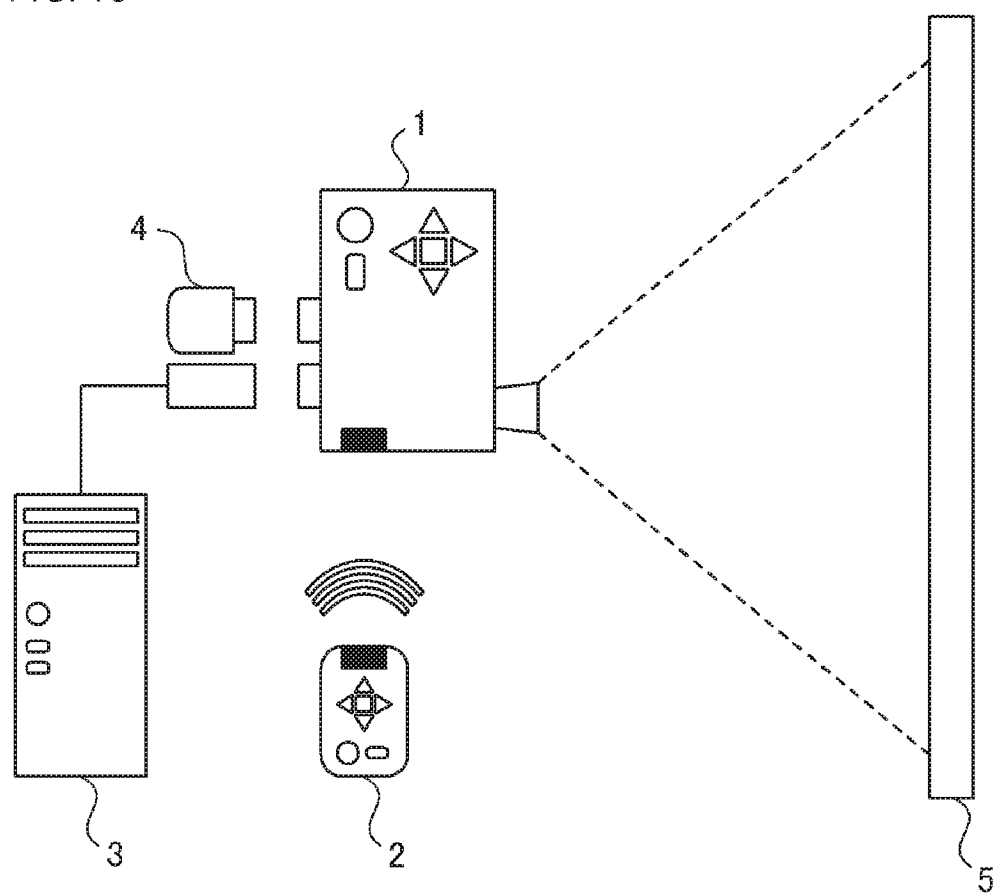
FIG. 13 is a schematic diagram of a display system according to Embodiments 1 to 3.

Embodiment 1 of the present invention will be explained next. FIG. 13 is a schematic diagram illustrating a display system having a projection apparatus 1. The projection apparatus 1 is a projector that projects an image onto a screen 5, on the basis of inputted image data (image signal) or image data stored in the interior of the projection apparatus 1. The screen 5 is a projection surface onto which there is projected the image (light representing an image) outputted from the projection apparatus 1. The screen 5 in Embodiment 1 is flat. The screen 5 may be a curved surface, or may be made up of part of the wall surface of a building. The remote control 2 is an operation member (remote controller) for enabling a user to operate the projection apparatus 1. The remote control 2 is provided with a plurality of buttons, and outputs control signals according to the buttons operated by the user. The projection apparatus 1 receives, by way of a reception unit thereof a control signal outputted from the remote control 2, and executes an operation according to the received control signal.

A computer 3, a universal serial bus (USB) memory 4 and the like can be connected to the projection apparatus 1. The computer 3 is an image output apparatus that outputs (transmits) image data to the projection apparatus 1. The computer 3 can be connected to the input unit of the projection apparatus 1 in a wired fashion. In Embodiment 1, the computer 3 is connected to the projection apparatus 1 using a cable conforming to the high-definition multimedia interface (HDMI) standard. The computer 3 and the projection apparatus 1 may also be connected to each other using a cable conforming to the USB standard. The USB memory 4 is a storage medium that stores image data to be projected by the projection apparatus 1, and that outputs image data to the projection apparatus 1.

Figure 1:
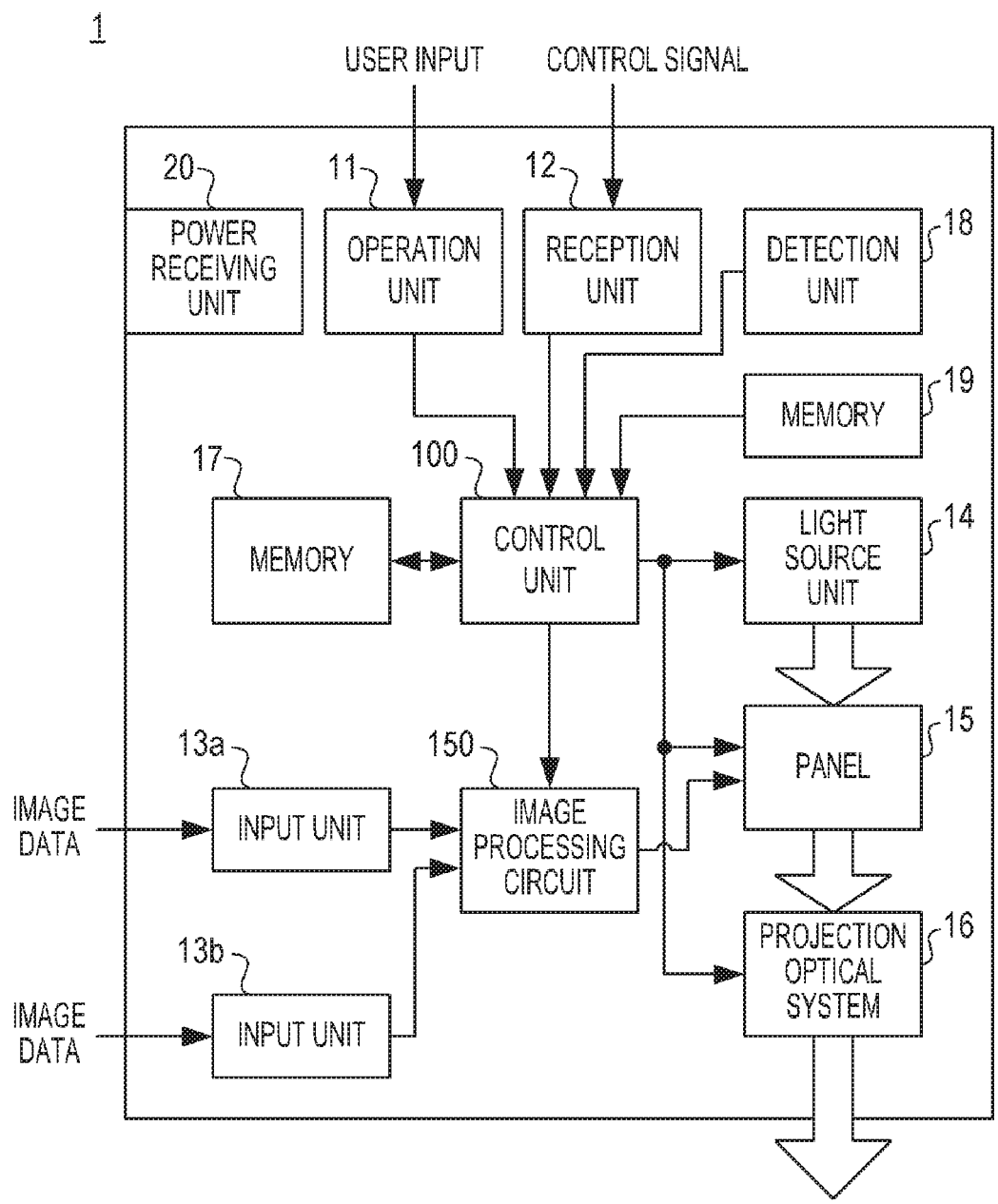
FIG. 1 is a configuration diagram of a projection apparatus according to Embodiments 1 to 3.

FIG. 1 is a configuration diagram of the projection apparatus 1. The projection apparatus 1 has an operation unit 11, a reception unit 12, input units 13a, 13b, a light source unit 14, a panel 15, a projection optical system 16, a memory 17, a detection unit 18, a memory 19, a control unit 100 and an image processing circuit 150.

The operation unit 11 is an operation member (reception unit; receiver) that receives a user operation (user input) and outputs a control signal according to a user operation. In Embodiment 1 the operation unit 11 has a power supply button, a menu button and a cursor button. The power supply button outputs a control signal for instructing power-on and power-off of the projection apparatus 1. The control unit 100 supplies power to configuration circuits of the projection apparatus 1, and initiates the operation thereof, in response to the input of a control signal instructing power-on. The control unit 100 terminates the operation of the configuration circuits of the projection apparatus 1 in response to input of a control signal instructing power-off, and after termination of the operations of the configuration circuits, stops supply of power to the configuration circuits. The menu button outputs a control signal instructing, to the control unit 100, settings of projection conditions and operation modes of the projection apparatus 1. The cursor button is a button enabling the user to operate a graphical user interface (GUI), in the setting of the projection conditions and operation modes of the projection apparatus 1. The operation member of the operation unit 11 is not limited to those in the above-described example. The operation unit 11 may have a touch panel or dial switch instead of buttons.

The reception unit (receiver) 12 is a reception circuit that receives control signals outputted from the remote control 2. The reception unit 12 outputs the received control signals to the control unit 100. Similarly to the operation unit 11, the remote control 2 as well is an operation member (reception unit) that receives a user operation, and outputs control signals in accordance with the user operation (user input).

The input units 13a, 13b are input terminals for inputting of image data from outside. For instance, the input unit 13a is an input terminal conforming to the HDMI standard, and such that the computer 3 can be connected to the input unit 13a. The input unit 13b is an input terminal conforming to the USB standard, and such that the USB memory 4 can be connected to the input unit 13b.

The light source unit 14 is a light source that outputs (irradiates) light onto the panel 15. The light source unit 14 may be any member capable of emitting light, and is for instance a halogen lamp, a xenon lamp, a high-pressure mercury lamp, a light emitting diode (LED), a laser or the like.

The panel 15 is a modulation panel that modulates light irradiated from the light source unit 14, to thereby output an image (light representing an image). The panel 15 transmits the light irradiated from the light source unit 14 according to transmittance (transmittance distribution) based on the image data inputted from the image processing circuit 150. Alternatively, the panel 15 reflects the light irradiated from the light source unit 14 according to reflectance (reflectance distribution) based on the image data inputted from the image processing circuit 150. In Embodiment 1, a transmissive liquid crystal panel serves as the panel 15. The panel 15 however is not limited to a liquid crystal panel.

The projection optical system 16 is an optical member for projecting an image outputted from the panel 15 onto the screen 5. The projection optical system 16 may be made up of for instance a plurality of lenses, a lens driving actuator and so forth, such that for instance the projected image can be scaled, shifting of the projection position can be adjusted, and the focus of the projection optical system 16 can be regulated, through driving of lenses by an actuator. The projected image is an image displayed on the screen 5, as a result of projection of the image outputted from the panel 15, and the projection position is a position, on the screen 5, at which the image outputted from the panel 15 is projected.

The memory 17 is a storage medium that stores data used for the operation of the control unit 100. In Embodiment 1, a dynamic random access memory (DRAM) that allows for writing and reading of data is used as the memory 17, such that the control unit 100 writes data on and reads data to/from the memory 17.

The detection unit (detector) 18 detects the state (installation state) of the projection apparatus 1. The installation state includes for instance the shape of the screen 5, the relative position of the screen 5 with respect to the projection apparatus 1, the orientation of the projection apparatus 1, the temperature in the periphery of the projection apparatus 1, and humidity in the periphery of the projection apparatus 1. The detection unit 18 includes one or more sensors, and a sensor control processor that controls the sensors.

For instance the detection unit 18 includes a gyro sensor, a camera, a distance measurement sensor and a thermo hygrometer. The detection unit 18 generates a distance map resulting from making, into a map, information denoting the positional relationship between the projection apparatus 1 and the screen 5, on the basis of at least one from among the output of the camera (captured image) and the output of the distance measurement sensor. The detection unit 18 outputs the distance map as information denoting the installation state (for instance the shape of the screen 5, the relative position of the screen 5 with respect to the projection apparatus 1). The detection unit 18 detects the orientation of the projection apparatus 1 (for instance whether the projection apparatus 1 is installed vertically or is installed horizontally) on the basis of the output of the gyro sensor, and detects the temperature and humidity in the periphery of the projection apparatus 1 on the basis of the output of the thermo hygrometer. The detection unit 18 can detect whether or not the projection apparatus 1 is installed hanging from a ceiling. The detection unit 18 can incorporate for instance the orientation (vertical installation, horizontal installation, ceiling suspension installation or the like) of the projection apparatus 1, the temperature in the periphery of the projection apparatus 1, and the humidity in the periphery of the projection apparatus 1, into the output information denoting the installation state.

The memory 19 is a storage medium that stores circuit configuration data used in order to configure the image processing circuit 150. The memory 19 is herein a read only memory (ROM). The memory 19 may have a function of holding data, and may be a storage medium to/from which data can be written/read, or an external apparatus of the projection apparatus 1. For instance, the memory 19 may be a volatile memory, a hard disk drive (HDD), an electrically erasable programmable read-only memory (EEPROM), the cloud or the like. A volatile memory can be used through writing of data from a communication channel, not shown. In Embodiment 1, circuit configuration data for an installation mode and circuit configuration data for a projection mode are saved (stored) beforehand in the memory 19.

The power receiving unit 20 is a power receiving circuit connected to an external power source, and that receives power for driving the projection apparatus 1. The power receiving unit 20 is connected to an alternating-current (AC) power supply via a cable. The power receiving unit 20 is a power supply circuit, connected to a so-called electrical outlet (power supply), and which receives power.

The control unit 100 is a processor for controlling the operation of the projection apparatus 1. The control unit 100 is for instance a central processing unit (CPU) that executes the below-described control (function) by executing a program that is read from the memory 17. The control unit 100 may be made up of a plurality of processors. Some or all of the control items executed by the control unit 100 may be executed by electronic circuits, without using a program.

The image processing circuit 150 is a circuit the configuration whereof can be modified. The image processing circuit 150 processes the inputted image data, and outputs image data for controlling projection of an image onto the screen 5, specifically image data for controlling the panel 15. The panel 15 controls transmittance or reflectance on the basis of the image data inputted from the image processing circuit 150. In Embodiment 1, a reconfigurable field-programmable gate array (FPGA) serves as the image processing circuit 150. It suffices that the image processing circuit 150 be a circuit the configuration whereof can be modified, and the image processing circuit 150 is not limited to being an FPGA Herein FPGAs are circuits the hardware configuration of which can be modified flexibly and easily through configuration of circuit functions, within the FPGA (circuits included in the FPGA), on the basis of circuit configuration data (configuration data). Such FPGAs are one type of programmable logic device (PLD: programmable logic circuit).

The term configuration refers to configuring of circuit functions within the FPGA on the basis of circuit configuration data for setting the FPGA. The term reconfiguration refers to configuring circuit functions within the FPGA, on the basis of other circuit configuration data, after circuit functions within the FPGA have been configured on the basis of given circuit configuration data.

In a reconfigurable FPGA, a circuit of function A can be reset to a circuit of function B, and a circuit of function B can be reset to a circuit of function A, and accordingly is not necessary to implement both a circuit of function A and a circuit of function B. As a result, the size (circuit scale) of the FPGA can be reduced, and the size and power consumption of an FPGA board can likewise be reduced.

Figure 2:
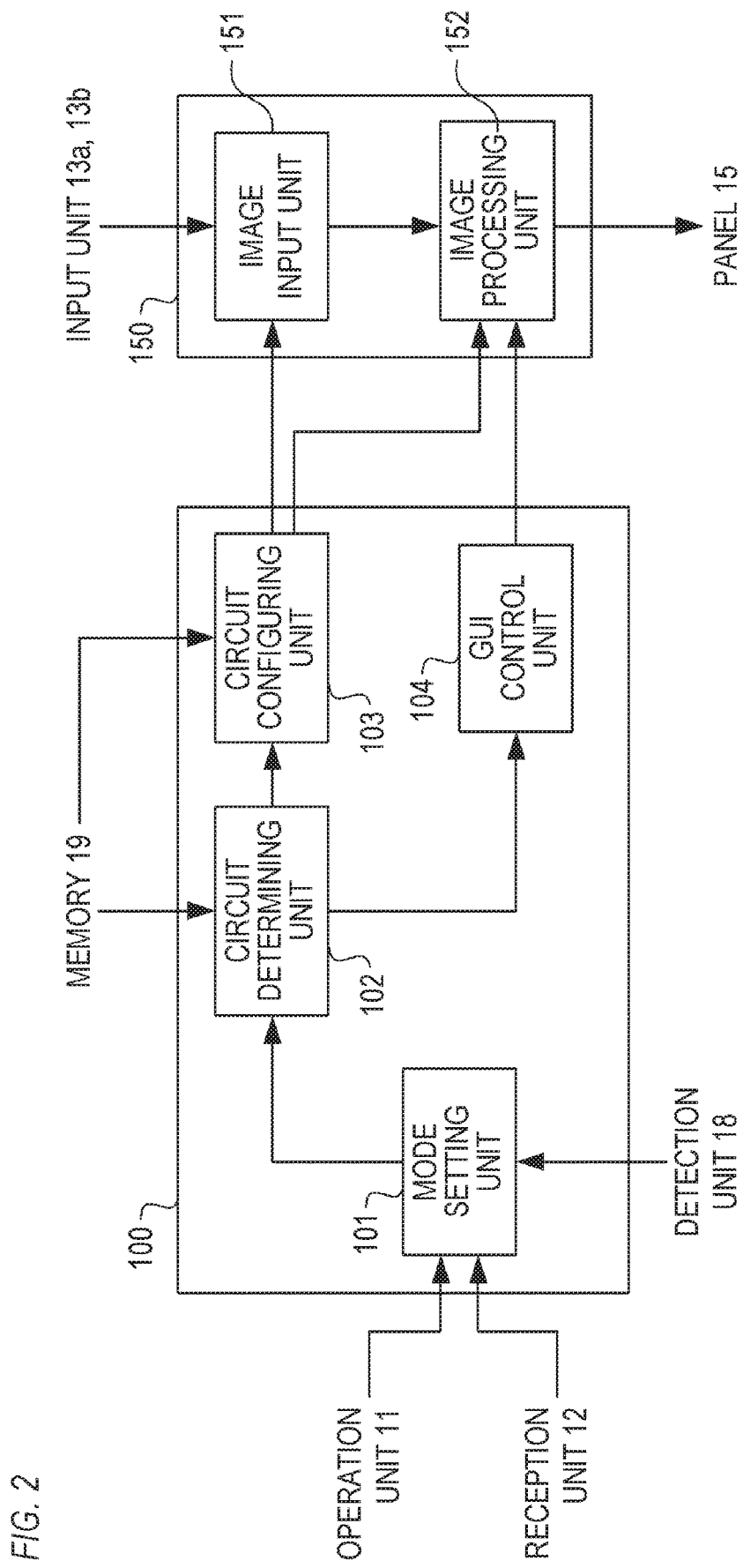
FIG. 2 is a schematic diagram of a control unit and an image processing circuit according to Embodiments 1 to 3.

FIG. 2 is a schematic diagram illustrating functional blocks and circuits of the control unit 100 and the image processing circuit 150. The control unit 100 will be explained next. The control unit 100 has a mode setting unit 101, a circuit determining unit 102, a circuit configuring unit 103 and a GUI control unit 104.

The mode setting unit 101 selects an operation mode of the projection apparatus 1. For instance, the mode setting unit 101 sets the operation mode of the projection apparatus 1 to either one of an installation mode and a projection mode. The projection mode is an operation mode in which an image is projected on the basis of image data inputted from an external apparatus (for instance the computer 3 or the USB memory 4) of the projection apparatus 1. The installation mode is an operation mode for adjusting and setting projection conditions at the time of projection of an image by the projection apparatus 1 onto the screen 5. The adjustment and setting of the projection conditions include for instance focus regulation of the projection optical system 16, adjustment of the angle of view of the projected image, input settings of the projection apparatus 1, adjustment of the range of the projected image, correction of distortion in the projected image, adjustment of the color of the projected image, adjustment of the brightness of the projected image, resolution settings of the projected image, aspect settings of the projected image, communication settings of the projection apparatus 1, display settings of an on-screen display (OSD) and so forth. An installation mode process includes a process of projecting, onto the screen 5, an image for adjustment established beforehand. In Embodiment 1, the mode setting unit 101 sets an operation mode in accordance with for instance a control signal (user instruction; user input for instructing an operation mode) inputted from the operation unit 11, and a control signal inputted from the remote control 2 via the reception unit 12.

The circuit determining unit 102 establishes the circuits to be configured in the image processing circuit 150 on the basis of the operation mode set by the mode setting unit 101 (operation mode of the projection apparatus 1). The circuit determining unit 102 manages for instance grasping of the circuits configured in the image processing circuit 150, and timings of execution of configuration (reconfiguration) of the image processing circuit 150, and manages for instance the sequence of configuration (reconfiguration) of the image processing circuit 150. In Embodiment 1 the circuit determining unit 102 selects circuit configuration data for instance in accordance with whether the set operation mode is the installation mode or is the projection mode. The circuit determining unit 102 outputs control information denoting for instance the selected circuit configuration data, configuration timing (timing for configuring the image processing circuit 150) and so forth, to the circuit configuring unit 103.

On the basis of the control information inputted from the circuit determining unit 102, the circuit configuring unit 103 reads, from the memory 19, circuit configuration data selected by the circuit determining unit 102, and configures (reconfigures) the image processing circuit 150 on the basis of the read circuit configuration data. The image processing circuit 150 is configured at the timing designated by the control information inputted from the circuit determining unit 102.

The GUI control unit 104 performs control for displaying an OSD image such as a menu, information (for instance information denoting the state of the projection apparatus 1) and the like, for instance in accordance with a control signal (user instruction) inputted from the operation unit 11, or a control signal inputted from the remote control 2 via the reception unit 12. In the case of display of an OSD image, specifically, the GUI control unit 104 outputs the OSD image (image data) to an image processing unit 152 (described below). The image processing unit 152 superimposes (image data synthesis; OSD superposition process) an OSD image (image data) inputted from the GUI control unit 104 onto the image (image data) inputted from an image input unit 151 (described below).

The image processing circuit 150 will be explained next. The image processing circuit 150 has an image input unit 151 and an image processing unit 152. The image input unit 151 and the image processing unit 152 are circuits that can be reconfigured through control by the control unit 100.

The image input unit 151 acquires (receives) image data (input image data) inputted from an external apparatus of the projection apparatus 1. The image input unit 151 outputs the acquired image data to the image processing unit 152. The image input unit 151 can generate predetermined image data and output the data to the image processing unit 152. The image input unit 151 may include the input units 13a, 13b which are input terminals. For instance, the image input unit 151 may include a DisplayPort (registered trademark) terminal, an HDMI (registered trademark) terminal or the like.

The image processing unit 152 performs image processing such as a filtering process, a scaling process, a color correction process, and an OSD superposition process, on the image data inputted from the image input unit 151. The image processing unit 152 outputs the image data after image processing to the panel 15.

FIG. 3A is a schematic diagram illustrating the configuration of the image processing circuit 150 (image input unit 151 and image processing unit 152) corresponding to a projection mode. The image input unit 151 corresponding to the projection mode will be explained next. A circuit that includes a data reception unit 301 and an input processing unit 302 is configured in the image input unit 151.

The data reception unit 301 has an image input interface circuit of a standard corresponding to the input units 13a, 13b, and receives data from the input units 13a, 13b. The data reception unit 301 interprets or decomposes an interface protocol that is specific to the received data. In a case where the received data is encrypted, the data reception unit 301 processes the data so as to decrypt the data. The data reception unit 301 has a circuit that executes a process of extracting image data from the received data. The data reception unit 301 outputs the image data to the input processing unit 302.

The input processing unit 302 converts the data format of the image data inputted from the data reception unit 301 to a data format that can be processed by the image processing unit 152, and outputs the image data, after conversion of the data format, to the image processing unit 152. Specifically, the input processing unit 302 performs a color conversion process of converting the color space of the image data from an RGB color space to a YUV color space, and a bit depth conversion a process of converting the bit depth of the image data, to convert thus the data format.

The image processing unit 152 corresponding to the projection mode will be explained next. A circuit including a noise reduction unit 303, a resolution conversion unit 304, a gradation conversion unit 305 and a keystone correction unit 306 is configured in the image processing unit 152.

The noise reduction unit 303 performs a process of reducing noise in the image data inputted from the image input unit 151. The noise reduction unit 303 outputs the processed image data to the resolution conversion unit 304.

The resolution conversion unit 304 performs a process of converting the resolution (number of pixels) in the image data inputted from the noise reduction unit 303. In addition to image scaling, the resolution conversion unit 304 can also perform conversion from interlaced to progressive. The resolution conversion unit 304 outputs the processed image data to the gradation conversion unit 305.

The gradation conversion unit 305 performs a process of converting a gradation value (pixel value) of the image data inputted from the resolution conversion unit 304. For instance, the gradation conversion unit 305 converts a gradation value using a lookup table (LUT). The gradation conversion unit 305 converts the processed image data to the keystone correction unit 306.

The keystone correction unit 306 processes the image data inputted from the gradation conversion unit 305 so as to correct (reduce) distortion in the projected image, using a keystone correction amount calculated beforehand. The keystone correction unit 306 outputs the processed image data to the panel 15.

FIG. 3B is a schematic diagram illustrating the configuration of the image processing circuit 150 (image input unit 151 and image processing unit 152) corresponding to the installation mode. The image input unit 151 corresponding to the installation mode will be explained next. A circuit that includes an image generating unit 311 is configured in the image input unit 151. The image generating unit 311 generates image data of a test pattern image necessary in an adjustment process for installation, and outputs the image data to the image processing unit 152. A circuit that processes data from the input units 13a, 13b is not configured in the image input unit 151 corresponding to the installation mode. The image generating unit 311 may read data necessary for generation of the test pattern image (image data) from the memory 17, or may read a test pattern image (image data) itself from the memory 17.

The image processing unit 152 corresponding to the installation mode will be explained next. A circuit that includes a keystone correction amount calculation unit 312, a zoom amount calculation unit 313, a focus regulation amount calculation unit 314 and a keystone correction unit 315 is configured in the image processing unit 152. In the installation mode, the image processing unit 152 processes the test pattern image (image data) inputted from the image input unit 151, and outputs the processed image data to the panel 15. As a result, a test pattern image is projected on the screen 5, in the installation mode. The projected test pattern image (projected image) is captured by a camera (imaging unit) included in the detection unit 18.

The keystone correction amount calculation unit 312 uses a captured image (image data) generated through capture of the projected test pattern image and a reference image (distortion-free image; image data) stored beforehand in the memory 17, to analyze for instance the distortion of the captured image, and thereby calculate a keystone correction amount. The keystone correction amount calculated by the keystone correction amount calculation unit 312 is used in the keystone correction units 306, 315.

The zoom amount calculation unit 313 calculates a zoom amount using the captured image of the test pattern image. The zoom amount calculated by the zoom amount calculation unit 313 is used for instance in the resolution conversion unit 304. The control unit 100 may control the projection optical system 16 so that the projected image is enlarged by the zoom amount calculated by the zoom amount calculation unit 313.

The focus regulation amount calculation unit 314 calculates a focus regulation amount of the projection optical system 16 using the captured image of the test pattern image. The focus regulation amount calculated by the focus regulation amount calculation unit 314 is used in the control unit 100. Specifically, the control unit 100 controls the projection optical system 16 so that focus is regulated according to the focus regulation amount calculated by the focus regulation amount calculation unit 314.

The keystone correction unit 315 processes the test pattern image (image data) inputted from the image input unit 151 so that the distortion of the projected image is corrected (reduced) using the keystone correction amount calculated by the keystone correction amount calculation unit 312. The keystone correction unit 315 outputs the processed image data to the panel 15. The keystone correction unit 315 may have the same circuit configuration as that of the keystone correction unit 306.

Figure 4:
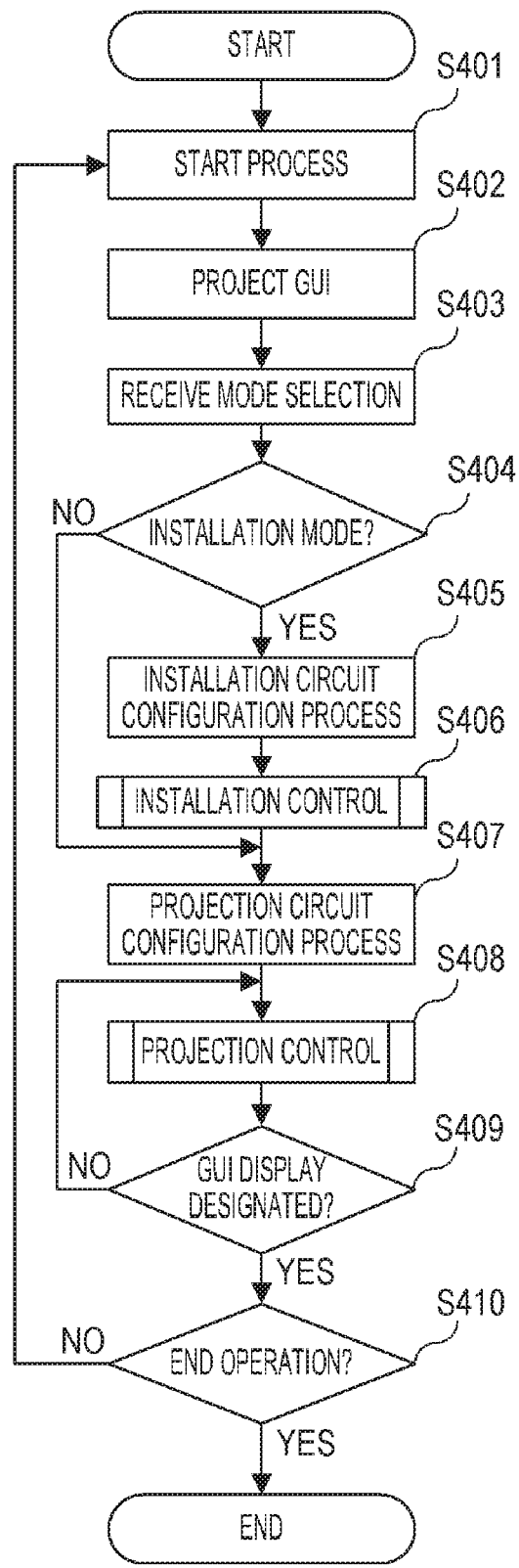
FIG. 4 is a flowchart illustrating a process of the projection apparatus according to Embodiment 1.

FIG. 4 is a flowchart illustrating a process in the projection apparatus 1. The present flowchart is initiated in response to an instruction of power-on (including returning from a standby state) of the projection apparatus 1 by the user, through the operation unit 11 or the remote control 2. Herein a power-off state, a standby state and so forth are operation stop states in which the operation of the projection apparatus 1 is stopped. That is, the present flowchart is executed when the projection apparatus 1 returns (starts up) from an operation stop state.

In step S401, the control unit 100 performs a startup process of the projection apparatus 1. In the startup process, the control unit 100 supplies power to the configuration circuits of the projection apparatus 1, to initiate the operation thereof. The control unit 100 performs control so as to project a predetermined startup image on the screen 5. Herein the projection apparatus 1 is set to start up in the projection mode.

In S402, the GUI control unit 104 performs control so as to project, on the screen 5, a GUI image (OSD image) for enabling the user to select the installation mode or the projection mode. Specifically, the GUI control unit 104 outputs a GUI image (image data) for mode selection to the image processing circuit 150 (image processing unit 152). The image processing unit 152 synthesizes a GUI image (image data) for mode selection, and outputs the synthesized image data to the panel 15.

In S403 the operation unit 11 or the remote control 2 receives a user operation for the GUI image (GUI image for mode selection) projected in S402. Herein the user operation is an operation of selecting an operation mode.

In S404 the mode setting unit 101 determines whether the operation mode selected as a result of the user operation in S403 is the installation mode or the projection mode. The mode setting unit 101 sets the operation mode (installation mode or projection mode) instructed (selected) as a result of the user operation in S403. In a case where the installation mode is selected, the mode setting unit 101 sets the installation mode, and the process proceeds to S405. In a case where the projection mode is selected, the mode setting unit 101 sets the projection mode, and the process proceeds to S407. The installation mode is an operation mode to be set in a state in which for instance installation or adjustment of the projection apparatus 1 is performed, and the projection mode is an operation mode to be set in a state in which image projection is performed. Accordingly, the determination in S404 can be deemed to be a "determination as to whether the state of the projection apparatus 1 is a state in which for instance installation or adjustment of the projection apparatus 1 is performed, or a state in which image projection is performed".

In S405 the circuit determining unit 102 selects a circuit (installation circuit; FIG. 3B) corresponding to the installation mode set in S404, as a circuit to be configured in the image processing circuit 150. The circuit configuring unit 103 configures (reconfigures) the image processing circuit 150 to the installation circuit (FIG. 3B) selected by the circuit determining unit 102.

In S406 the projection apparatus 1 performs installation control using a function of the image processing circuit 150 reconfigured to the installation circuit. The details of installation control will be described below. The process proceeds to S407 in response to completion of installation control.

In S407, the circuit determining unit 102 selects a circuit (projection circuit; FIG. 3A) corresponding to the projection mode selected by the mode setting unit 101, as a circuit that is configured in the image processing circuit 150. The circuit configuring unit 103 configures (reconfigures) the image processing circuit 150 to the projection circuit (FIG. 3A) selected by the circuit determining unit 102.

In S408 the projection apparatus 1 performs projection control using a function of the image processing circuit 150 reconfigured to a projection circuit. The details of projection control will be described below.

In S409 the control unit 100 (GUI control unit 104) determines whether or not there is an instruction (user operation) of displaying a GUI image for instructing termination of the flowchart of FIG. 4. The GUI image is for instance an image that allows the user to select whether to terminate projection or not. The user operation involves for instance pressing a power supply button of the operation unit 11 or of the remote control 2. In a case where there is an instruction (user operation), the GUI image for instructing termination of the flowchart of FIG. 4 is projected on the screen 5, and the process proceeds to S410. In a case where there is no instruction, the process returns to S408 and the projection process is repeated.

In S410 the control unit 100 determines whether the user has performed or not a termination operation (operation of terminating the flowchart of FIG. 4) on the GU image projected in S409. In a case where the termination operation has been carried out, the flowchart in FIG. 4 is terminated, whereas if a termination operation has not been carried out, the process returns to S401.

Figure 5A:
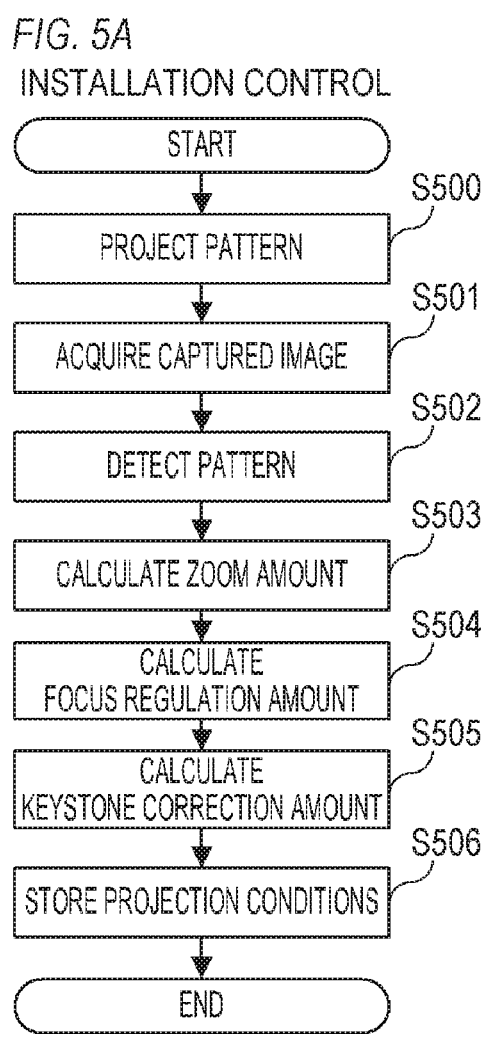
FIG. 5A is a flowchart illustrating installation control according to Embodiment 1.

FIG. 5A is a flowchart illustrating installation control in S406. In installation control, a process pertaining to for instance installation and adjustment of the projection apparatus 1 is executed.

In S500 the image generating unit 311 generates a test pattern image (image data) for installation. The test pattern image is processed in the image processing unit 152, and is outputted to the panel 15. As a result, the test pattern image is projected on the screen 5.

In S501 the test pattern image (projected image) projected on the screen 5 is captured by a camera (imaging unit), included in the detection unit 18, to acquire (generate) a captured image (image data).

In S502 the image processing unit 152 analyzes the captured image acquired in S501, to detect the test pattern image (at least part of a captured image) from the captured image. This process is carried out in at least any one of for instance the keystone correction amount calculation unit 312, the zoom amount calculation unit 313 and the focus regulation amount calculation unit 314.

In S503 the zoom amount calculation unit 313 calculates a zoom amount on the basis of the size of the test pattern image (at least part of the captured image) detected in S502. For instance, the zoom amount is calculated so that the size of the test pattern image lies within a predetermined range, in the captured image.

In S504, the focus regulation amount calculation unit 314 calculates a focus regulation amount so that a frequency component of the test pattern image (at least part of the captured image) detected in S502 satisfies a predetermined condition. A focus regulation amount is calculated so that for instance the character "+" is projected as the test pattern image, or so that the number of frequency components included in the test pattern image (at least part of the captured image) detected in S502 is equal to or greater than a threshold value.

In S505 the keystone correction amount calculation unit 312 calculates a keystone correction amount on the basis of the shape of the test pattern image (at least part of the captured image) detected in S502. For instance, the keystone correction amount is calculated so that distortion in the projected image (test pattern image) or in the test pattern image (at least part of the captured image) detected in S502 is equal to or smaller than a threshold value. In a case where a quadrangular (rectangular, square or the like) test pattern image is projected, the term distortion denotes for instance the degree of deviation from a quadrangle (rectangle, square or the like).

In S506, the projection conditions calculated in S503 to S505 (zoom amount, focus regulation amount and keystone correction amount) are stored in the memory 17. Specifically, the zoom amount calculation unit 313 stores the zoom amount in the memory 17, the focus regulation amount calculation unit 314 stores the focus regulation amount in the memory 17, and the keystone correction amount calculation unit 312 stores the keystone correction amount in the memory 17. In a case where projection conditions are already stored, these stored projection conditions are updated. The image processing circuit 150 outputs installation completion information, denoting completion of the installation control, to the mode setting unit 101. The mode setting unit 101 sets the projection mode, in response to the input of the installation completion information.

Figure 5B:
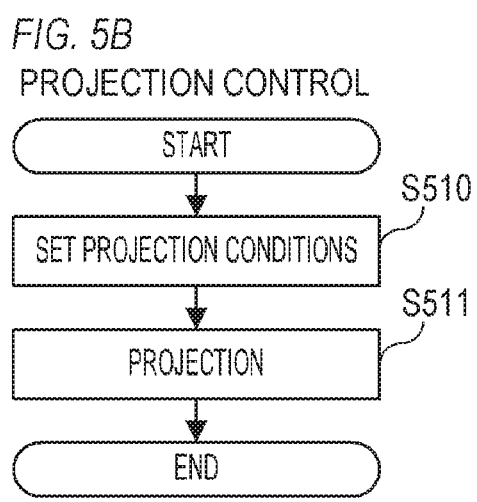
FIG. 5B is a flowchart illustrating projection control according to Embodiment 1.

FIG. 5B is a flowchart illustrating projection control in S408. In projection control, a process pertaining to projection is executed. In S510, the control unit 100 reads from the memory 17 the projection conditions stored in the memory 17, and sets the projection conditions in the image processing unit 152. For instance, the keystone correction amount calculated in S505 is set in the keystone correction unit 306. In S511 the image input unit 151 acquires input image data from an external apparatus via the input unit 13a or the input unit 13b. The input image data is processed in the image input unit 151 and the image processing unit 152, and is outputted to the panel 15. As a result, an image based on input image data is projected on the screen 5.

As described above, at the time of the installation mode in Embodiment 1 the FPGA is reconfigured to an installation circuit and installation control is carried out, whereas at the time of the projection mode, the FPGA is reconfigured to a projection circuit, and projection control is carried out. As a result, suitable installation control (installation function) and projection control (projection function) can be realized without an increase in resources (circuit resources; hardware resources) that are necessary in the FPGA.

Embodiment 2

Embodiment 2 of the present invention will be explained next. In the projection apparatus 1 of Embodiment 1, the circuit scale of the image processing circuit 150 could be reduced by configuring the circuit according to either one operation mode from among the installation mode and the projection mode. The necessary projection conditions (for instance necessary geometric corrections) vary significantly depending for example on the shape (for instance distortion) of the screen 5 and the angle of the screen 5 with respect to the projection apparatus 1. In a case for example where projection apparatus 1 is installed facing the screen 5, i.e. in the case of a facing installation, a complex geometric correction is not always necessary (i.e. it suffices to perform a comparatively simple geometric correction), and the resources required for geometric correction are not necessarily large. In a case where the projection direction of the projection apparatus 1 is significantly slanted with respect to the screen 5 i.e. in the case of a slanted installation, a comparatively complex geometric correction is necessary, and substantial resources need to be allocated to geometric correction. In the projection apparatus 1 of Embodiment 2 the circuits to be configured in the image processing circuit 150 are determined in accordance with the installation state of the projection apparatus 1. The configuration of the projection apparatus 1 in Embodiment 2 is identical to that of Embodiment 1 (FIGS. 1 and 2), and hence the details of the configuration will not be explained herein.

The mode setting unit 101 of Embodiment 2 acquires the detection result (installation state of the projection apparatus 1) by the detection unit 18, and outputs it to the circuit determining unit 102. The mode setting unit 101 allows setting, in response to user input, whether to execute or not a circuit configuration process (described below) of configuring (reconfiguring) the image processing circuit 150 to a circuit corresponding to the installation state. When the circuit configuration process is carried out each time that the installation state changes, the appearance of the projected image may possibly change whenever the installation state changes. In cases where this is not desirable, the function of the circuit configuration process can be limited on the basis of a preliminary setting.

The circuit determining unit 102 of Embodiment 2 determines a circuit (circuit configuration data) to be configured in the image processing circuit 150, on the basis of the installation state inputted from the mode setting unit 101.

FIG. 6 is a table illustrating an example of circuit configuration data for projection, stored in the memory 19, in the projection apparatus 1 of Embodiment 2. The installation state 1 is a state in which the projection apparatus 1 is installed at a position and in an orientation so as to face the screen 5, and such that the screen 5 is not distorted. The installation state 2 is a state in which the screen 5 is significantly distorted, or the screen 5 is not flat. The installation state 3 is an installation state not corresponding to the installation state 1 or installation state 2. Circuit configuration data corresponding to the installation state is stored beforehand in the memory 19. In Embodiment 2 three respective circuit configuration data sets are stored (saved) in three storage regions of the memory 19.

Circuit configuration data 1 is stored at an address 0x0000 of the memory 19. A circuit for executing a deformation function, namely keystone correction and warping correction of the projected image is not implemented, whereas a circuit for executing unevenness correction in the projected image is implemented, in the image processing circuit 150 corresponding to the circuit configuration data 1. The resources allocated to the circuit for execution of unevenness correction are large. The greater the bit depth (gradation of an image) of the target image data (image data to be processed; for instance, input image data), the larger are the resources that are allocated to the image processing circuit 150 as a whole. The bit depth of the target image data in the image processing circuit 150 corresponding to the circuit configuration data 1 is herein large. The circuit configuration data 1 is associated with the installation state 1.

Circuit configuration data 2 is stored at an address 0x1000 of the memory 19. A circuit for executing an unevenness correction is not implemented, whereas a circuit for executing a deformation function, namely keystone correction and warping correction, is implemented, in the image processing circuit 150 corresponding to the circuit configuration data 2. The resources allocated to the circuit for executing the deformation function are large. Specifically, a circuit for executing unevenness correction and a circuit for executing keystone correction are not implemented, whereas a circuit for executing warping correction is implemented, in the image processing circuit 150 corresponding to the circuit configuration data 2. The resources allocated to the circuit for executing warping correction are large. The bit depth of the target image data is smaller than in the circuit configuration data 1. The circuit configuration data 2 is associated with the installation state 2.

Circuit configuration data 3 is stored at an address 0x2000 of the memory 19. A circuit for executing a deformation function, namely keystone correction and warping correction, and a circuit for executing unevenness correction, are implemented in the image processing circuit 150 corresponding to the circuit configuration data 3. Comparable resources that are not large are allocated to the circuits in the image processing circuit 150. The bit depth of the target image data is not large, and is smaller than in the circuit configuration data 1. The circuit configuration data 3 is associated with the installation state 3.

The circuit scale of the image processing circuit 150 is substantially the same among the circuit configuration data 1 to 3; the image processing circuit 150 for the circuit configuration data 1 to 3 can be configured at a circuit scale that can be accommodated by limited resources.

An example of the preparation of three sets of circuit configuration data 1 to 3 has been explained above, but the number of sets of the prepared circuit configuration data may be greater or smaller than three. The circuit configuration data may be prepared for each correction range of keystone correction, the circuit configuration data may be prepared for each grid point count of warping correction, the circuit configuration data may be prepared for each grid point count of unevenness correction, and the circuit configuration data may be prepared for each bit depth. A plurality of circuit configuration data sets may be prepared by modifying combinations such as correction range of keystone correction, grid point count of warping correction, grid point count of unevenness correction, bit depth and so forth. The circuit configuration data (circuit configuration data for the installation mode and circuit configuration data for the projection mode) explained in Embodiment 1 may be stored in the memory 19.

Warping correction will be explained next with reference to FIGS. 7A to 7C. In order to perform warping correction, a coordinate conversion table according to the positional relationship between the projection surface and the viewer (relative position of one from among the projection surface and the viewer with respect to the other) is stored beforehand in a memory. In warping correction, distortion in the projected image is reduced through distortion of target image data, on the basis of the actual positional relationship between the projection surface and the viewer, and on the basis of a coordinate conversion table in the memory. The coordinate conversion table represents for instance a positional relationship between grid points prior to deformation and grid points after deformation. Grid points in warping correction are described below. In correction for deforming an image, the arrangement of pixels is modified, as in warping correction; accordingly, the values of pixels that make up the image after correction are worked out in an arithmetic process from pixel values of an image prior to correction. An interpolation process of making up for pixels in the image is carried out as the arithmetic process.

Figure 7A:
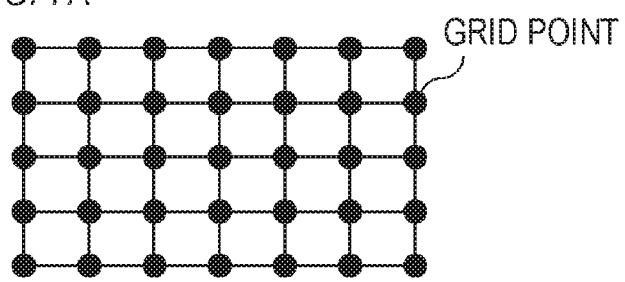
FIGS. 7A to 7C are schematic diagrams for explaining warping correction according to Embodiment 2.

FIG. 7A is a diagram illustrating a relationship between a target image (target image data) and grid points. In Embodiment 2 vertices of a plurality of areas that make up a target image are set as grid points. Specifically, 35 grid points (intersections; see black circles in FIG. 7A) of a grid that divides a target image into 6 horizontal×4 vertical areas are herein set. The number of grid points may be greater or smaller than 35. In the circuit configuration data 3 of FIG. 6, 32 grid points are set, and in the circuit configuration data 2, 128 grid points are set. No warping correction is carried out in the circuit configuration data 1, and accordingly no grid points for warping correction are set herein.

Figure 7B:
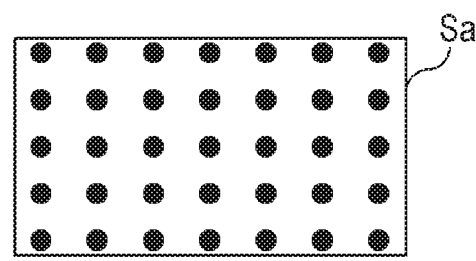
Figure 7C:
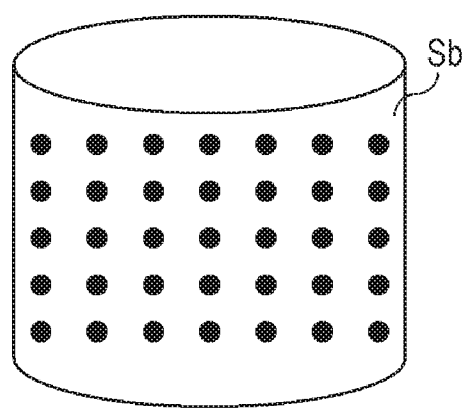

FIGS. 7B and 7C are diagrams illustrated in a relationship between the shape of the projection surface and grid points of the projected image. The grid points of the projected image correspond to the grid points of the target image. An example will be explained herein in which warping correction of the target image is carried out in such a manner that a rectangular projected image is displayed.

In FIG. 7B the projection surface Sa is flat, and faces the projection apparatus 1. A non-distorted rectangular projected image can be displayed in such a case even if the positions of the grid points in FIG. 7A are corrected (modified). Therefore, the circuit configuration data 1 for which warping correction is not carried out and the circuit configuration data 3 for which the number of grid points in warping correction is comparatively small, are suitable for a case such as that in FIG. 7B. The circuit configuration data 1, which allows displaying a projected image of yet higher image quality (projected image of high gradation and little unevenness), is more preferable herein.

In FIG. 7C, by contrast, a projection surface Sb is not flat but is a side face of a cylinder. Accordingly, a projected image distorted to a shape different from a rectangle is displayed in a case where the positions of the grid points in FIG. 7A are not corrected (modified). Thanks to warping correction, an undistorted rectangular projected image can be displayed through distortion of the target image in such a manner that the positions of the grid points in FIG. 7A (positions prior to projection; positions on the target image) become the positions of the grid points in FIG. 7C (positions after projection; positions on the projected image (projection surface Sb)). Accordingly, the circuit configuration data 2 and 3, for which warping correction is performed, are suitable for a case such as that of FIG. 7B. Herein the circuit configuration data 3, for which the number of grid points is comparatively small, is more preferable when distortion of the projected image, in a state where no warping correction is carried out, is small. The circuit configuration data 2, for which the number of grid points in warping correction is comparatively large, is more preferable when the distortion of the projected image, in a state where no warping correction is carried out, is large.

Thus, the deformation process (process of deforming an image; for instance, warping correction) is not necessary in FIG. 7B in a case where a rectangular projected image is to be displayed, but a deformation process is necessary, and a circuit to that end is required, in FIG. 7C.

Unevenness correction will be explained next with reference to FIGS. 8A and 8B. Non-uniformity in at least one from among brightness and color may occur in the projected image for instance depending on the optical characteristics (reflectance unevenness and so forth) of the projection surface, the characteristics of the panel 15 (for instance modulation rate (transmittance or reflectance)), and the optical characteristics of the projection optical system 16. In unevenness correction, such unevenness that arises in the projected image is reduced. In order to correct unevenness, specifically, multiple grid points (intersections; black circles in FIG. 8A) of a grid that divides the projected image into a plurality of areas are established beforehand, and an offset value is associated beforehand with each grid point. In unevenness correction a respective correction value is calculated through interpolation computation using a respective offset value of each grid point, and the pixel values of the target image are corrected using the calculated correction values.

Figures 8A, 8B:
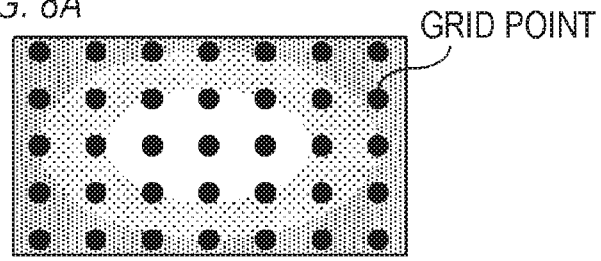
FIGS. 8A and 8B are schematic diagrams for explaining unevenness correction according to Embodiment 2.

FIG. 8A is a diagram illustrating a relationship between a projected image and grid points. In FIG. 8A, unevenness arises in the form of growing darkness with increasing distance from the center of the projected image. Herein, 35 grid points of a grid that divides a target image into 6 horizontal×4 vertical areas are set.

FIG. 8B is a diagram illustrating 35 offset values respectively corresponding to the 35 grid points in FIG. 8A. In FIG. 8B the offset values are established in such a manner that the values thereof increase with increasing distance from the center of the projected image, with a view to reducing unevenness in FIG. 8A. The offset values of the grid points are added, as correction values, to the pixel values at positions corresponding to the positions of the grid points (values of pixels projected at positions of the grid points), from among the plurality of pixel values of the target image. Correction values are calculated through interpolation computation, in which the offset values mapped to grid points in the periphery of pixels are used, at positions not corresponding to the positions of the grid points.

The circuit configuration data 1, 3, for which unevenness correction is carried out, are suitable in the case of unevenness occurring in the projected image, as illustrated in FIG. 8A. The circuit configuration data 1, in which the number of grid points in unevenness correction is comparatively large, is more preferable for instance in a case where the projection apparatus 1 is installed facing the screen 5, and in a case where unevenness occurring in the projected image is large, in a state where no unevenness correction is carried out. Otherwise, the circuit configuration data 3, in which the number of grid points in unevenness correction is comparatively small, is more preferable.

For instance a memory for storage of various data pertaining to the grid points, and also an arithmetic unit (multiplier or adder) used in an interpolation process (interpolation calculation) are often used in warping correction and unevenness correction. In warping correction and unevenness correction, the precision of correction is improved through an increase in the number of grid points, but this entails an increase in the data size of various data pertaining to the grid points, as well as a larger circuit scale (for instance of the memory). Various proposed methods, not limited to the above method, can be used for warping correction and unevenness correction. A keystone correction method will not be explained herein, but various proposed methods can be used also for keystone correction. A circuit for executing keystone correction is made up of for instance a line memory and an arithmetic unit used for an interpolation process.

Thus, the higher the precision of correction is in keystone correction, warping correction and unevenness correction, the more circuits are required; likewise; the wider the deformation range, the more circuits are necessary. Also, data band is significantly influenced herein by bit depth, and more circuits and required with increasing bit depth. The circuit configuration data 1 to 3 explained in FIG. 6 are established beforehand so as to yield data suitable for use by the user, for instance with correction precision and circuit scale in mind.

Figure 9:
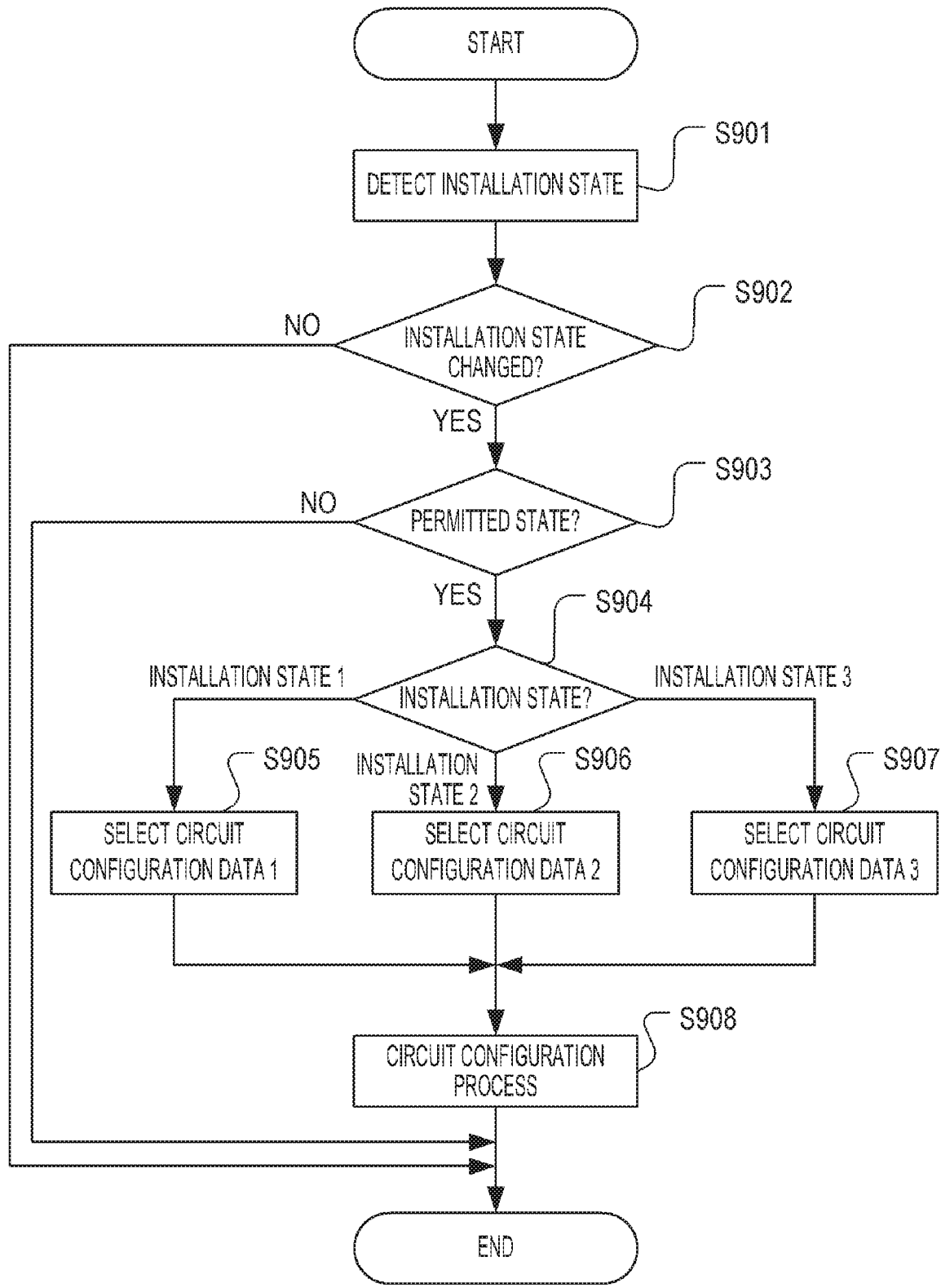
FIG. 9 is a flowchart illustrating a process of a projection apparatus according to Embodiment 2.

FIG. 9 is a flowchart illustrating a process of the projection apparatus 1 of Embodiment 2. The present flowchart is initiated in response to an instruction of power-on (including return from a standby state) of the projection apparatus 1 from the user to the operation unit 11 or the remote control 2. Herein a power-off state, a standby state and so forth are operation stop states in which the operation of the projection apparatus 1 has stopped. Specifically, the present flowchart is executed when the projection apparatus 1 returns (starts up) from an operation stop state. The present flowchart is executed repeatedly during startup of the projection apparatus 1. The present flowchart is initiated for instance in response to an instruction by the user to the effect of executing a circuit update, issued via the operation unit 11 or the remote control 2, or is executed repeatedly at a predetermined time interval.

In S901, the detection unit 18 detects the installation state of the projection apparatus 1, and outputs (transmits) the detection result to the mode setting unit 101.

In S902 the mode setting unit 101 determines whether the installation state of the projection apparatus 1 (detection result by the detection unit 18) has changed or not. A change in the installation state is for instance a change in the orientation of the projection apparatus 1, or a change in the state of the distortion of the screen 5. A threshold value for determination whether the installation state of the projection apparatus 1 has changed or not is set beforehand, with some margin built therein, so as to preclude frequent changes in the image quality of the projected image (changes of the image processing circuit 150). The installation state of the projection apparatus 1 is determined to have changed when the projection apparatus 1 returns (starts) from an operation stop state. In a case where the installation state has changed, the process proceeds to S903; otherwise, the flowchart of FIG. 9 ends.

In S903, the mode setting unit 101 determines whether or not a permitted state is set in which execution of configuration (reconfiguration) in a circuit according to the installation state of the projection apparatus 1 is permitted. In the absence of a permitted state, the flowchart of FIG. 9 ends, whereas in the case of a permitted state, the process proceeds to S904.

In S904 the mode setting unit 101 determines the installation state of the projection apparatus 1 on the basis of information (for instance detection result in S901; captured image of the projection surface, distance map and so forth) inputted from the detection unit 18, and outputs the determination result to the circuit determining unit 102. Specifically, the mode setting unit 101 determines which one of the installation states 1 to 3 in FIG. 6 the detection result in S901 corresponds to. In a case where the installation state of the projection apparatus 1 is installation state 1, the process proceeds to S905; in a case where the installation state of the projection apparatus 1 is installation state 2, the process proceeds to S906; and in a case where the installation state of the projection apparatus 1 is installation state 3, the process proceeds to S907.

In S905 the circuit determining unit 102 selects the circuit configuration data 1, and outputs the selection to the circuit configuring unit 103. In S906 the circuit determining unit 102 selects the circuit configuration data 2, and outputs the selection to the circuit configuring unit 103. In S907 the circuit determining unit 102 selects the circuit configuration data 3, and outputs the selection to the circuit configuring unit 103.

In S908, the circuit configuring unit 103 configures (reconfigures) the image processing circuit 150 on the basis of the circuit configuration data selected in S905, S906 or S907. In Embodiment 2 the image processing unit 152 is modified. The gradation conversion unit 305 is modified for instance in order to modify unevenness correction or modify the bit depth, and the keystone correction unit 306 is modified for instance in order to modify keystone correction or modify warping correction.

In Embodiment 2, as described above, circuits are reconfigured in accordance with the installation state of the projection apparatus, to thereby allow reconfiguring the projection apparatus to a state suitable for use by the user, without incurring increases in the cost of the projection apparatus. An example has been explained in which a projection apparatus determines the installation state; alternatively, the installation state may be inputted to the projection apparatus by the user. Further, for instance installation candidates and circuit candidates may be established beforehand depending for example on the manufacturer, or may be registered or modified by the user. For instance, at the time of installation of the projection apparatus or projection by the projection apparatus, the user may register a desired circuit while associated with a current installation state.

Embodiment 3

Embodiment 3 of the present invention will be explained next. As described above, in a case where a projection apparatus having a reconfigurable image processing circuit is controlled so as to configure an installation circuit in response to startup of the projection apparatus it becomes possible to implement an installation function immediately even if the installation environment has changed, since a previous shutdown until startup. In a case where no change in the installation environment has occurred since a previous shutdown until startup, however, a projection condition adjusted at the time of (termination of) a previous use can be used, and hence there is no process to be executed for configuration of the installation circuit in this case, and time is wasted in startup. A problem arises in that when the types of circuit to be configured at the time of startup of the projection apparatus are uniquely fixed, the time elapsed until initiation of normal use becomes then more prolonged.

This is not limited to restart from a state in which the power has been switched off, and it may be conceivably necessary, also when the projection circuit is being used in the projection apparatus, to reconfigure and adjust the projection circuit, being in use, to for instance another installation circuit, in the case for example of movement of the apparatus or changes in the peripheral environment. A problem arises in that the user may fail to recognize the need for performing an adjustment in such a case, and projection may continue as a result with inappropriate settings.

Therefore, a method for solving the above problem will be explained in Embodiment 3. The configuration of the projection apparatus in Embodiment 3 is the configuration illustrated in FIGS. 1 and 2, and is identical to the configuration explained in Embodiment 1, and therefore will not be explained herein.

The mode setting unit 101 acquires a state (state information) used in order for the circuit determining unit 102 to determine a circuit reconfiguration plan. The state acquired by the mode setting unit 101 includes for instance a state of apparatus configuration including the projection optical system 16, the panel 15, the light source unit 14, and optical members such as an optical filter (not shown), as well as consumable members such as a dust filter (not shown). The state acquired by the mode setting unit 101 may include any one of an installation angle, an installation position and an installation direction detected by the gyro sensor of the detection unit 18. The state acquired by the mode setting unit 101 may include for instance a peripheral temperature (temperature of the periphery of the projection apparatus 1) detected by a temperature sensor of the detection unit 18, and a peripheral brightness (brightness of the periphery of the projection apparatus 1; brightness of ambient light) detected by an ambient light sensor.

The mode setting unit 101 stores the acquired state in the memory 17. Specifically, the acquired state is recorded by the mode setting unit 101 in the memory 17 in the form of log data associated with information denoting the timing of acquisition. In Embodiment 3 the mode setting unit 101 acquires a state in response to reception of an instruction of turning off the power supply of the projection apparatus 1. The mode setting unit 101 may acquire the state at a timing instructed by the user using the operation unit 11, or may acquire the state automatically at arbitrary time intervals. In Embodiment 3, the memory 17 is a non-volatile recording medium, and the log data denoting the state is maintained even when the power supply of the projection apparatus 1 is turned off.

The circuit determining unit 102 compares a current state acquired by the mode setting unit 101 and a past state stored in the memory 17. The circuit determining unit 102 determines a circuit reconfiguration plan based on the comparison result. The circuit determining unit 102 determines whether reconfiguration according to a reconfiguration plan is to be performed or not, using also information, acquired from the memory 17, denoting the type (type of the current circuits that configure the image processing circuit 150) of the image processing circuit 150 at the point in time of comparison. In a case for instance where a circuit designated in a reconfiguration plan determined according to the state comparison result is already configured in the image processing circuit 150 (is in use), then reconfiguration is not performed again. In some instances, the circuit reconfiguration plan may include a plurality of circuits that are reconfigured sequentially (for instance reconfiguration to the installation circuit, and after installation process is complete, reconfiguration to the projection circuit).

The circuit configuring unit 103 controls the image processing circuit 150 so that the circuits according to the reconfiguration plan (circuits) determined by the circuit determining unit 102 are configured in the image processing circuit 150. The circuit configuring unit 103 stores, in the memory 17, information denoting which circuits are the circuits having been configured (current circuits that are configured in) the image processing circuit 150. In Embodiment 3, the memory 17 is a non-volatile recording medium, and the information denoting a current circuit is not expunged from the memory 17, even when supply of power to the projection apparatus 1 is turned off.

The projection apparatus 1 of Embodiment 3 receives power via the power receiving unit 20; and, in a state (standby state) where no startup instruction has been received via the power supply button of the operation unit 11, the circuits to be configured at startup are determined beforehand in response to detection of a change in the installation state.

Figure 10:
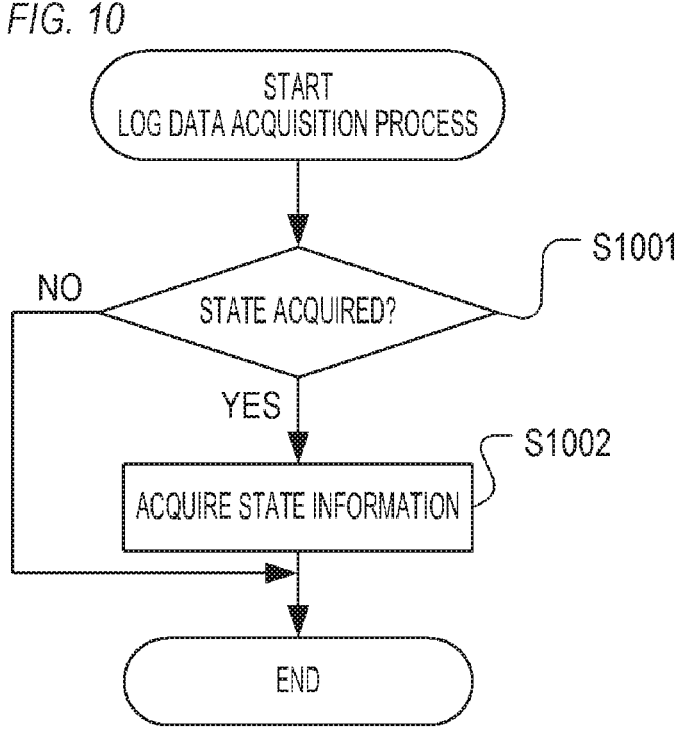
FIG. 10 is a flowchart illustrating a process of acquiring log data according to Embodiment 3.

FIG. 10 is a flowchart illustrating a process for acquiring log data of the installation state. The present flowchart is executed repeatedly during startup of the projection apparatus 1.

In S1001 the mode setting unit 101 determines whether or not a state is to be acquired. State acquisition is executed, as described above, at a timing established beforehand, or in response to an acquisition instruction by the user. For instance Yes (acquire state) is determined in S1001 in a case for example where the projection apparatus 1 receives press-down of the power supply button (for instance an instruction of turning off the power supply of the projection apparatus 1, or bringing the projection apparatus 1 to a standby state) during a projection operation. In a case where a state is to be acquired, the process proceeds to S1002; otherwise, the flowchart in FIG. 10 ends.

In S1002 the mode setting unit 101 acquires state information denoting a state, and stores the acquired information in the memory 17.

Figure 11:
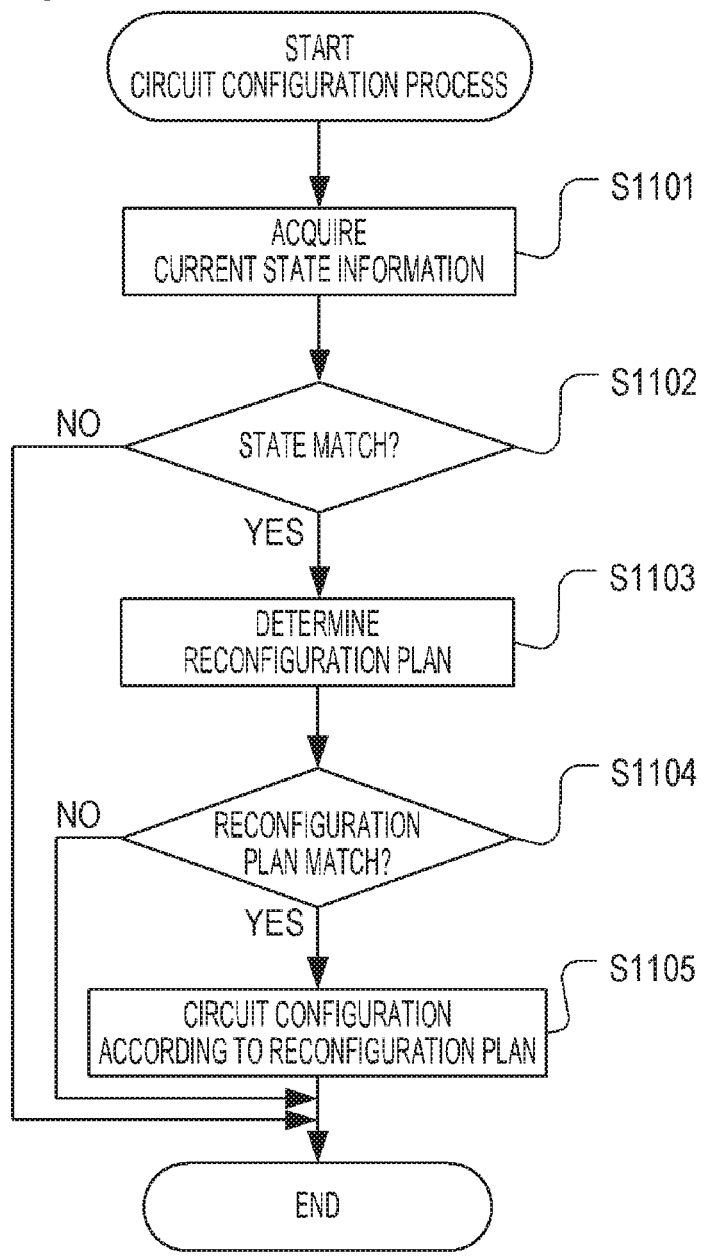
FIG. 11 is a flowchart illustrating a process of determining configuration circuits according to Embodiment 3.

FIG. 11 is a flowchart illustrating a process of determining configuration circuits (circuits to be configured at the time of startup) in the standby state. The present flowchart is executed repeatedly in the standby state. The present flowchart may be executed irregularly at a pre-set timing during the standby state. In a case where the startup timing is managed beforehand for instance by scheduling software, the present flowchart may be executed directly prior to the startup process. The present flowchart may be executed prior to execution of the startup process, in response to press-down of the power supply button of the operation unit 11. The present flowchart may be executed in a case where an amount of change of a parameter (temperature or orientation) detected by the detection unit 18 is equal to or greater than a predetermined value.

In S1101 the mode setting unit 101 acquires state information denoting the current state of the projection apparatus 1.

In S1102 the mode setting unit 101 acquires log data from the memory 17, and determines whether or not the state of the projection apparatus 1 directly preceding a previous shut down is identical to the state acquired in S1101. The state for comparison is herein for instance a parameter acquired from the detection unit 18 (orientation, peripheral temperature, peripheral brightness and so forth), or a state of the apparatus configuration of the projection apparatus 1. In a case where in a comparison of parameters acquired from the detection unit 18 there is a change larger than a predetermined threshold value according to the type of the parameter, it is determined that the state is not the same. If the state is the same, it is determined that the image processing circuit 150 need not be reconfigured, and the present flowchart is terminated. If the state is not the same, the process proceeds to S1103.

In S1103 the circuit determining unit 102 determines the circuits (reconfiguration plan) to be configured in the image processing circuit 150, on the basis of the state information acquired in S1101.

In S1104, the circuit determining unit 102 acquires, from the memory 17, information denoting the circuits that are already configured in the image processing circuit 150, and determines whether the circuits already configured in the image processing circuit 150 and the circuits (reconfiguration plan) determined in S1103 are the same or not. If the circuits are the same, it is determined that the image processing circuit 150 need not be reconfigured, and the present flowchart is terminated. If the circuits are not the same, the process proceeds to S105.

In S1105 the circuit configuring unit 103 causes the circuits (reconfiguration plan) determined in S1103 to be configured in the image processing circuit 150.

Figure 12:
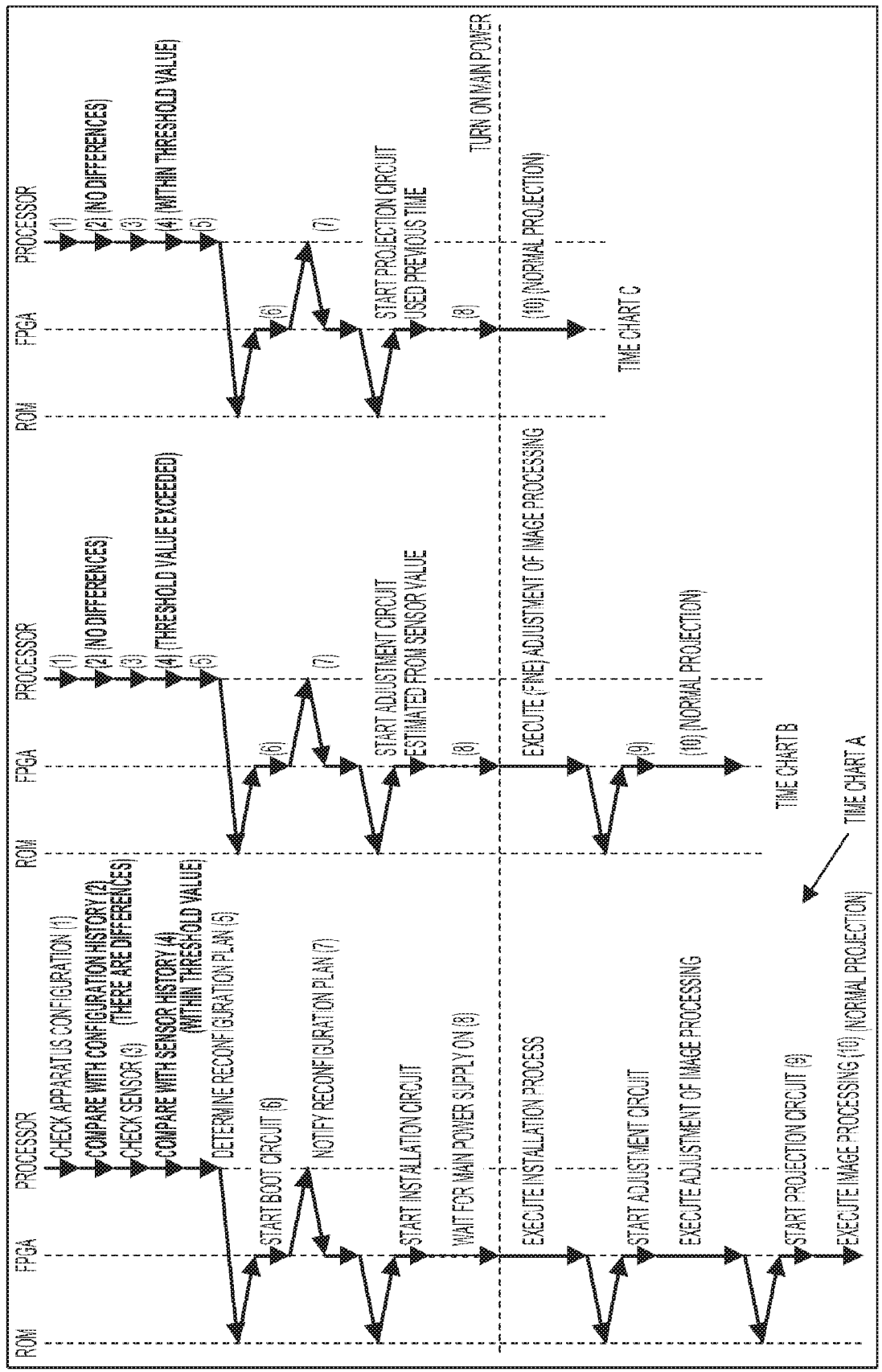
FIG. 12 is a set of time charts illustrating the operation of a projection apparatus according to Embodiment 3.

FIG. 12 is a set of time charts A to C illustrating the operation of the projection apparatus 1 according to Embodiment 3. In time charts A to C a state is acquired and held immediately before the power supply of the projection apparatus 1 is turned off. The charts illustrate the operation from the point in time at which for instance a plug is inserted into an outlet, in order to turn on the main power supply and bring about a standby state. The ROM in FIG. 12 is the memory 19, the FPGA is the image processing circuit 150 and the processor is the control unit 100 (mode setting unit 101, circuit determining unit 102 and circuit configuring unit 103).

Time chart A is a time chart of an instance where the installation process needs to be redone, for example in the case of a change in the apparatus configuration.

The mode setting unit 101 acquires a state pertaining to the current apparatus configuration. As an example, a member (lamp) of the light source unit 14 has hypothetically been replaced herein. The mode setting unit 101 communicates with the light source unit 14, to acquire information about the serial number of the lamp installed in the light source unit 14.

The mode setting unit 101 compares a state pertaining to a current apparatus configuration with a state pertaining to the apparatus configuration stored in the memory 17. The fact of the lamp having been replaced is revealed, in time chart A, on the basis of a state comparison (herein a serial number comparison).

The mode setting unit 101 acquires a state pertaining to a current sensor value (for instance installation angle, installation position, installation direction, peripheral temperature or peripheral brightness). The mode setting unit 101 compares the state pertaining to the current sensor value with the state pertaining to the sensor value held in the memory 17. In time chart A the amount of change of the state pertaining to the sensor value is equal to or smaller than a threshold value, and it is determined that no change has occurred in the state pertaining to the sensor value.

In time chart A the apparatus configuration (light source unit 14) has changed. In that case it is very likely that the installation position of the projection apparatus 1 has shifted. It is therefore necessary to redo the installation process after turning on the power, and it is likewise necessary to adjust image processing given that for instance also the brightness of the light source unit 14 has changed. Accordingly, the circuit determining unit 102 determines a reconfiguration plan that involves performing an installation process after reconfiguration to an installation circuit, adjusting image processing after completion of the installation process, and performing normal projection after completion of the adjustment of image processing. That is, the reconfiguration plan in time chart A is determined so that three circuits, namely (1) the installation circuit for the installation process, (2) an adjustment circuit for adjustment of image processing and (3) a projection circuit for normal use, are sequentially reconfigured in the image processing circuit 150.

Prior to configuring the image processing circuit 150 according to this reconfiguration plan, the circuit configuring unit 103 configures a boot circuit in the image processing circuit 150. The boot circuit is a circuit having the minimum functions necessary for circuit reconfiguration. The boot circuit need not include a circuit that is used in the image input unit 151 or the image processing unit 152. If there are however functions (circuits) that may be inputted immediately following startup, then such functions may be incorporated into the boot circuit. The FPGA that is started up by the boot circuit is herein set to be externally reconfigurable at an arbitrary timing.

The circuit determining unit 102 notifies the determined reconfiguration plan to the circuit configuring unit 103.

The circuit configuring unit 103 reads, from the memory 19, the circuit configuration data of the installation circuit, and reconfigures the image processing circuit 150 to the installation circuit, in accordance with the reconfiguration plan determined by the circuit determining unit 102. After the main power supply is turned on, the user ordinarily performs a setting operation, which takes some time, while using the installation process in the installation circuit configured beforehand in the image processing circuit 150.

After completion of the installation process (setting operation), the circuit configuring unit 103 reads, from the memory 19, circuit configuration data of an adjustment circuit and reconfigures the image processing circuit 150 to the adjustment circuit, in accordance with the reconfiguration plan determined by the circuit determining unit 102. The user performs an adjustment operation, while using the adjustment process in the adjustment circuit configured beforehand in the image processing circuit 150.

After completion of the adjustment process (adjustment operation), the circuit configuring unit 103 reads, from the memory 19, circuit configuration data of the projection circuit, and reconfigures the image processing circuit 150 to the projection circuit, in accordance with the reconfiguration plan determined by the circuit determining unit 102. Thereafter, the projection apparatus 1 operates in a normal use (projection) state.

In time chart A, and accordingly it takes a long time until the projection state of normal use is set, since the installation process and the adjustment process are performed. These processes are however necessary for performing proper projection. An instance where the apparatus configuration has changed is illustrated herein, but the installation process may conceivably be performed in the manner of time chart A also in a case where the apparatus configuration does not change. For instance, it is estimated that the installation environment has changed for example in a case where an acceleration sensor (not shown) mounted on the projection apparatus 1 has detected movement of the apparatus, or in a case where an illuminance sensor (not shown) detects a significant change in a sensor value. In such a case a reconfiguration is performed in the order illustrated in time chart A.

Time chart B is a chart of an instance in which an installation operation need not be redone, but a state change of a degree wherein an adjustment operation is necessary is received. Only differences with respect to time chart A will be explained herein. In time chart B there is no change in apparatus configuration such as that in the light source unit 14.

Time chart B is premised on a larger fluctuation in a sensor value than a threshold value established beforehand. For example, it is considered that an adjustment operation (image processing adjustment) is necessary in a case for instance where ambient light brightness around the projection apparatus 1 has changed noticeably. Therefore, a threshold value of change in brightness is established beforehand, and reconfiguration is herein set to be carried out in a case where the change in brightness exceeds the threshold value.

In time chart B there occurs no change in apparatus configuration such as a replacement of a lamp in the light source unit 14. In consequence there is no need to repeat the installation process after power is turned on. However, the fluctuation of the sensor value, namely the brightness of ambient light, exceeds the threshold value, and it is necessary to adjust image processing to be suitable for the current state. Therefore, the circuit determining unit 102 determines a reconfiguration plan that involves performing a (fine) adjustment of image processing after reconfiguration of the image processing circuit 150 to a circuit estimated according in accordance with change, and performing normal projection after completion of the (fine) adjustment of the image processing. Herein the installation process need not be redone, and the image processing circuit according to a state change is estimated using the sensor value; accordingly, it is considered that the adjustment amount of image processing is very small as compared with that in time chart A. That is the reason why the expression "fine adjustment" is used herein. Specifically, the reconfiguration plan in time chart B is determined so that two circuits, namely (1) an adjustment circuit for (fine) adjustment of image processing and (2) an image processing circuit for normal use, are sequentially reconfigured in the image processing circuit 150.

The circuit configuring unit 103 reads, from the memory 19, the circuit configuration data of the adjustment circuit, and reconfigures the image processing circuit 150 to the adjustment circuit, in accordance with the reconfiguration plan determined by the circuit determining unit 102. After the main power supply is turned on, the user performs an adjustment operation ((fine) adjustment of image processing) while using the adjustment process that can be implemented in the adjustment circuit configured beforehand in the image processing circuit 150.

In Time chart B reconfiguration to an installation circuit is omitted, since it is determined that the installation process is not necessary. Accordingly, a projection state of normal use can be set in a shorter time than in the case of time chart A.

Time chart C is a time chart of a case where it is not necessary to redo the installation operation or the adjustment operation. Only differences with respect to time charts A and B will be explained herein. In time chart C the apparatus configuration does not change, and the fluctuation of a sensor value (sensor value acquired by the detection unit 18) lies within a pre-set threshold value. Accordingly, it is determined that no state change has occurred that warrants adjustment of the image processing. The circuit determining unit 102 determines a reconfiguration plan in which image processing previously carried out is performed as it is (without modifying image processing parameters such as keystone correction amount, zoom amount, focus regulation amount and so forth). The circuit configuring unit 103 reads a previously used circuit configuration data from the memory 19, and reconfigures the image processing circuit 150 to the projection circuit. Herein the specific data of the circuit configuration data having been previously used is stored beforehand in the memory 17, as described above.

In time chart C the image processing circuit 150 having been used in a previous projection state of normal use can be used as it is, since it is determined that the installation process and the adjustment process are not necessary. Accordingly, a projection state of normal use can be set in a shorter time than in the case of time chart B.

As described above, in Embodiment 3 the state of the projection apparatus at the time of shutdown and the state of the projection apparatus in a standby state are compared, and the circuits to be configured in the image processing circuit 150 are determined beforehand; as a result, it becomes possible to initiate quickly a suitable operation upon startup of the projection apparatus.

The blocks in Embodiments 1 to 3 (FIGS. 1, 2, 3A and 3B) may or may not be individual hardware blocks. The functions of two or more blocks may be realized by shared hardware. Multiple functions of one block may be realized by respective individual hardware units. Two or more functions of one block may be realized by shared hardware. Further, each block may or may not be realized by hardware. For instance, an apparatus may have a processor and a memory having a control program stored therein. The function of at least some of the blocks of the apparatus may be realized through reading of a control program from a memory, and execution of the control program, by a processor.

Embodiments 1 to 3 are merely examples (including the above-described variations), and features resulting from appropriately modifying or altering the features of the first to third embodiments, within the scope of the present invention, are encompassed by the invention. The present invention encompasses also features arrived at through appropriate combination of the features in Embodiments 1 to 3.

According to the present disclosure, circuits can be configured in a projection apparatus so as to satisfy suitable specifications (functions, performance, circuit scale and so forth).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084489, filed on Apr. 25, 2019, which is hereby incorporated by reference herein in its entirety.

What is claimed is:

1. A projection apparatus comprising:
a field programmable gate array (FPGA) configured to control projection; and
at least one processor which functions as:
a determination unit configured to determine a state of the projection apparatus; and
a configuration unit configured to change a circuit configuration of the FPGA to a circuit configuration corresponding to the state of the projection apparatus determined by the determination unit, wherein
in a case where use of the projection apparatus is resumed, the configuration unit does not change the circuit configuration of the FPGA if the FPGA already has the circuit configuration corresponding to the state of the projection apparatus determined by the determination unit, even if the state of the projection apparatus at a previous end timing of the projection apparatus is different from a current state of the projection apparatus.

2. The projection apparatus according to claim 1, wherein the configuration unit
changes the circuit configuration of the FPGA to a first circuit configuration for executing a process relating to installation, in a case where the projection apparatus is in a first state; and
changes the circuit configuration of the FPGA to a second circuit configuration for executing a process relating to projection, in a case where the projection apparatus is in a second state.

3. The projection apparatus according to claim 2, wherein after the circuit configuration of the FPGA is changed to the first circuit configuration, the configuration unit changes the circuit configuration of the FPGA to the second circuit configuration in response to completion of a predetermined process.

4. The projection apparatus according to claim 1, further comprising:
a receiver configured to receive a user input instructing an operation mode of the projection apparatus;
wherein the determination unit determines the state of the projection apparatus in accordance with the user input received by the receiver.

5. The projection apparatus according to claim 1, further comprising:
a detector configured to detect the state of the projection apparatus;
wherein the determination unit determines the state of the projection apparatus in accordance with a detection result by the detector.

6. The projection apparatus according to claim 5, wherein the detector detects an orientation of the projection apparatus.

7. The projection apparatus according to claim 1, wherein in a case where use of the projection apparatus is resumed, the configuration unit changes the circuit configuration of the FPGA if the FPGA does not have the circuit configuration corresponding to the state of the projection apparatus determined by the determination unit.

8. A control method of a projection apparatus, comprising:
a control step of controlling projection by a field programmable gate array (FPGA);
a determination step of determining a state of the projection apparatus; and
a configuration step of changing a circuit configuration of the FPGA to a circuit configuration corresponding to the state of the projection apparatus determined in the determination step, wherein
in a case where use of the projection apparatus is resumed, in the configuration step, the circuit configuration of the FPGA is not changed if the FPGA already has the circuit configuration corresponding to the state of the projection apparatus determined in the determination step, even if the state of the projection apparatus at a previous end timing of the projection apparatus is different from a current state of the projection apparatus.

9. The control method according to claim 8, wherein
in the configuration step,
the circuit configuration of the FPGA is changed to a first circuit configuration for executing a process relating to installation, in a case where the projection apparatus is in a first state; and
the circuit configuration of the FPGA is changed to a second circuit configuration for executing a process relating to projection, in a case where the projection apparatus is in a second state.

10. The control method according to claim 9, wherein
after the circuit configuration of the FPGA is changed to the first circuit configuration, in the configuration step, the circuit configuration of the FPGA is changed to the second circuit configuration, in response to completion of a predetermined process.

11. The control method according to claim 8, further comprising:
a reception step of receiving a user input instructing an operation mode of the projection apparatus;
wherein in the determination step, the state of the projection apparatus is determined in accordance with the user input received in the reception step.

12. The control method according to claim 8, further comprising:
a detection step of detecting the state of the projection apparatus;
wherein in the determination step, the state of the projection apparatus is determined in accordance with a detection result in the detection step.

13. The control method according to claim 12, wherein
in the detection step, an orientation of the projection apparatus is detected.

14. The control method according to claim 8, wherein
in a case where use of the projection apparatus is resumed, in the configuration step, the circuit configuration of the FPGA is changed if the FPGA does not have the circuit configuration corresponding to the state of the projection apparatus determined in the determination step.

15. A non-transitory computer readable medium that stores a program, wherein the program causes a computer to execute a control method of a projection apparatus, comprising:
a control step of controlling projection by a field programmable gate array (FPGA);
a determination step of determining a state of the projection apparatus; and
a configuration step of changing a circuit configuration of the FPGA to a circuit configuration corresponding to the state of the projection apparatus determined in the determination step, wherein
in a case where use of the projection apparatus is resumed, in the configuration step, the circuit configuration of the FPGA is not changed if the FPGA already has the circuit configuration corresponding to the state of the projection apparatus determined in the determination step, even if the state of the projection apparatus at a previous end timing of the projection apparatus is different from a current state of the projection apparatus.

* * * * *